United States Patent
Eronen et al.

(10) Patent No.: US 10,445,797 B2
(45) Date of Patent: Oct. 15, 2019

(54) METHOD AND APPARATUS FOR VERIFYING ASSOCIATION OF USERS WITH PRODUCTS AND INFORMATION

(71) Applicant: Provenance Asset Group LLC

(72) Inventors: Antti Johannes Eronen, Tampere (FI); Juha Henrik Arrasvuori, Tampere (FI); Arto Juhani Lehtiniemi, Lempaala (FI)

(73) Assignee: PROVENANCE ASSET GROUP LLC, Essex, CT (US)

( * ) Notice: Subject to any disclaimer, the term of this patent is extended or adjusted under 35 U.S.C. 154(b) by 239 days.

(21) Appl. No.: 15/683,382

(22) Filed: Aug. 22, 2017

(65) Prior Publication Data

US 2018/0033060 A1    Feb. 1, 2018

Related U.S. Application Data

(63) Continuation of application No. 13/463,510, filed on May 3, 2012, now abandoned.

(51) Int. Cl.
G06Q 30/00    (2012.01)
G06Q 30/06    (2012.01)
G06Q 30/02    (2012.01)

(52) U.S. Cl.
CPC ........... *G06Q 30/06* (2013.01); *G06Q 30/02* (2013.01)

(58) Field of Classification Search
None
See application file for complete search history.

(56) References Cited

U.S. PATENT DOCUMENTS

| | | | | |
|---|---|---|---|---|
| 2012/0023403 A1* | 1/2012 | Herberger | ............ | G06F 16/639 715/716 |
| 2012/0254060 A1* | 10/2012 | Choudhary | ............ | G06Q 30/00 705/347 |
| 2013/0046823 A1* | 2/2013 | Mitchell | ............ | G06Q 10/107 709/204 |
| 2014/0029801 A1* | 1/2014 | Chua | ................. | G06K 9/00744 382/103 |
| 2015/0154685 A1* | 6/2015 | Pope | ................. | G06Q 30/0631 705/26.62 |

* cited by examiner

*Primary Examiner* — Mila Airapetian
(74) *Attorney, Agent, or Firm* — Dinsmore & Shohl LLP

(57) ABSTRACT

An approach is provided for substantially automatically determining that a user is associated with at least one product. A processing platform determines one or more media files, one or more content files, or a combination thereof, which are associated with the at least one product. Further, the processing platform associates the one or media files, one or more content files, or a combination thereof with descriptive information associated with the at least one product.

20 Claims, 11 Drawing Sheets

METHOD AND APPARATUS FOR VERIFYING ASSOCIATION OF USERS WITH PRODUCTS AND INFORMATION

RELATED APPLICATION

This application is a continuation of U.S. patent application Ser. No. 13/463,510, filed May 3, 2012, entitled "METHOD AND APPARATUS FOR VERIFYING ASSOCIATION OF USERS WITH PRODUCTS AND INFORMATION", which is incorporated herein by reference in its entirety.

BACKGROUND

Service providers and device manufacturers (e.g., wireless, cellular, etc.) are continually challenged to deliver value and convenience to consumers by, for example, providing compelling network services. One area of interest has been the development of internet services such as online shopping and obtaining or providing information (e.g., evaluations, testimonials, endorsements, comparisons, user experience, etc.) related to products or services of interest available via online (e.g., online merchants) or traditional marketplace. For example, a user may seek information (e.g., provided by other users or service providers) about a certain product (e.g., a camera) and/or the user may wish to provide information (e.g., to other users, service providers, etc.) about that certain product. Similarly, merchants and service providers are interested in collecting the information about various products from users who may own and/or have experience with those products. Generally, users may submit their information about certain products of interest to various web sites (e.g., personal blogs, public blogs, social networking sites, online merchants, etc.); however, for many users, it is difficult to interact with various websites, locate the products of interest, and submit their information. Further, the merchants and the service providers would like to receive the information with certain level of accuracy and verification that the users providing the information about a certain product actually own and/or have experience with the product. Accordingly, service providers and device manufacturers are challenged to develop accurate and easy to use mechanisms for users and merchants to submit and receive, respectively, product and user information.

Some Example Embodiments

Therefore, there is a need for an approach for verifying association of users with products and information.

According to one embodiment, a method comprises determining that a user is associated with at least one product. The method also comprises determining one or more media files, one or more content files, or a combination thereof associated with the at least one product. The method further comprises causing, at least in part, an association of the one or media files, one or more content files, or a combination thereof with descriptive information associated with the at least one product.

According to another embodiment, an apparatus comprises at least one processor and at least one memory including computer program code for one or more programs, the at least one memory and the computer program code configured to, with the at least one processor, cause the apparatus to determine that a user is associated with at least one product. The apparatus is also caused to determine one or more media files, one or more content files, or a combination thereof associated with the at least one product. The apparatus is further caused to cause, at least in part, an association of the one or media files, one or more content files, or a combination thereof with descriptive information associated with the at least one product.

According to another embodiment, a computer-readable storage medium carries one or more sequences of one or more instructions which, when executed by one or more processors, cause, at least in part, an apparatus to determine that a user is associated with at least one product. The apparatus is also caused to determine one or more media files, one or more content files, or a combination thereof associated with the at least one product. The apparatus is further caused to cause, at least in part, an association of the one or media files, one or more content files, or a combination thereof with descriptive information associated with the at least one product.

According to another embodiment, an apparatus comprises means for determining that a user is associated with at least one product. The apparatus also comprises means for determining one or more media files, one or more content files, or a combination thereof associated with the at least one product. The apparatus further comprises means for causing, at least in part, an association of the one or media files, one or more content files, or a combination thereof with descriptive information associated with the at least one product.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for verifying association of users with products and product information. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
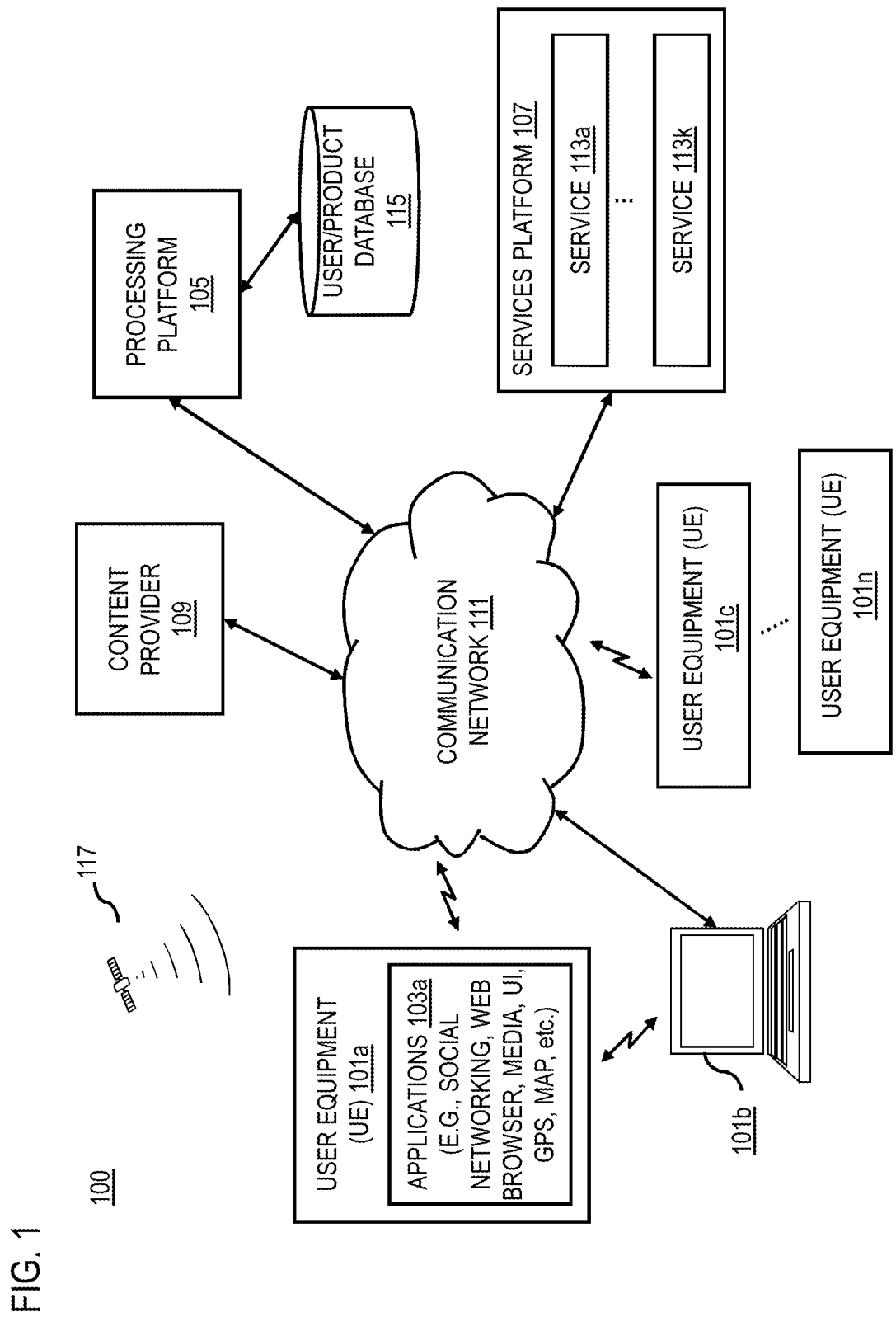
FIG. 1 is a diagram of a system capable of verifying association of users with products and product information, according to one embodiment.

FIG. 1 is a diagram of a system capable of verifying association of users with products and product information, according to one embodiment. As mentioned, service providers (e.g., merchants) need an efficient method for collecting product information from users associated (e.g., owning, having experience) with various user products while the users need an easy and user friendly method for finding/identifying products that they own and/or have experience with, and for providing various product information, wherein the product information may include media files, content files, user experience, testimonials, comments, comparisons, ratings, quality issues, and the like. In general, the product information may be useful to users when considering a certain product and/or service (e.g., online, at a merchant location, by a service provider, etc.), which they are not familiar with and would like to review related product information (e.g., offered by other users and/or service providers) in order to have a better understanding of the product. Further, the merchants and/or the service providers would like to collect accurate and verified product and user information, which may be utilized for marketing, advertising, promotions, business decisions, and the like. However, users willing to provide/share product and user information find it burdensome (e.g., unfamiliar with various websites and online technologies) to search for and find the products they own and then submit relevant user and product information. As such, there is a need for an easy, user friendly and accurate mechanism for the service providers to receive user and product information, which can be verified with a certain level of confidence.

To address these problems, a system 100 of FIG. 1 introduces the capability for determining that a user is associated with at least one product and obtaining one or more information items (e.g., media, content, etc.) for verifying the user to product association, wherein the user may provide additional information associated with the at least one product. By way of example, in the system 100 a user may view a product (e.g., a camera) at an online site (e.g., online merchant), which may be a same product as the user owns and/or has experience with. In one scenario, the user utilizes one or more features of a user interface (UI) (e.g., click a button "I own this product") to indicate (e.g., to the merchant, to a service provider, etc.) that he owns the same product as currently being viewed. Further, a service provider may request one or more information items (e.g., a media file, content file, etc.) associated with the product so that it can be verified that the user does indeed own and/or has experience with the product. In one example, the user grants permission to the service provider for accessing/retrieving the one or more information items, which may be available via a user device (e.g., a camera, a mobile phone, a PC, etc.), via a storage repository, via a content provider, and the like. Furthermore, once the service provider verifies that the product and the one or more information items are associated, the service provider may request additional information from the user, for example, as to which information items to utilize (e.g. best rated or most watched media files). Additionally the service provider may present various prompts to the user so the user may add additional descriptive information (e.g., testimonials, comments, ratings, etc.), or the user may set privacy and/or security policies regarding the utilization of the information items (e.g., available to certain people or service providers), and the like. Moreover, once the service provider completes the verification process, the user information and/or the one or more product information may be made available to other users and/or service providers according to the set privacy and/or security policies (e.g., social proximity, social networking, service provider members, fee based, etc.). In another example, a user may provide a list and/or a media file (e.g., photo, video, etc.) including information and/or images of one or more products associated with the user (e.g., own, experience, etc.). In another example, a user providing user and/or product information may receive incentives (e.g., coupons, discounts, points, etc.) offered by the merchant and/or the service provider.

In one embodiment, the system 100 determines that a user is associated with at least one product. In one embodiment, a service provider (e.g., an online merchant, a service provider) receives an indication (e.g., a message via a web browser) from a user indicating that the user is associated (e.g., owns, has experience) with at least one product. In one embodiment, a service provider receives a message from the user, wherein the user finds a product of interest in an online catalog and utilizes a UI feature (e.g., a button) to indicate "I own this product" and in another example, the UI may have one or more features for indicating various possibilities such as "I have experience with this product," "I had this product," and the like. In one embodiment, the service provider may receive a listing of one or more products, a media file including one or more images of one or more products, and the like, which are associated with a user. In one embodiment, the service provider may receive an indication/message from a user indicating one or more combinations of one or more products (e.g. a camera plus a certain type of lens). In one embodiment, the service provider has access to a compilation of different products a user owns or has experience with; for example, a camera 1 with a lens 1; and upon subsequent visits/searches by the user for one or more compatible products (e.g. for other camera lenses), the service provider may present one or more comparisons of one or more related products based on one or more available product information (e.g., by other users, ratings, testimonial, etc.) to the user's current product such as the camera 1 with a lens 2, the camera 1 with a lens 3, and the like. In one embodiment, the service provider may compile and store one or more information (e.g., a serial number) of each product, so when a product is sold/transferred to a new owner, the previous media, and/or content from the product's original owner may still be accessible.

In one embodiment, the system 100 determines one or more media files, one or more content files, or a combination thereof associated with the at least one product. In one embodiment, the service provider receives one or more media files, which may include one or more images associated with the at least one product. For example, a media file including an image of a television set owned by the user. In another embodiment, the service provider receives one or more content files associated with at least one product, for example, a content file (e.g., a photo file) from a camera owned by the user. In another embodiment, a media file includes one or more product identification information items such as a barcode, a photo of packaging of the product, and the like. In one embodiment, the service provider utilizes context information associated with a product reference. For example, a user may be browsing a dog food product page and may indicate "I use this product," wherein the service provider obtains information from the description of the product that this is a dog food product and the media/content/images to be searched/retrieved should contain an indicator/tag related to "dog." Further, the service provider may retrieve all media (e.g., pictures) including a dog and/or the indicator/tag "dog," and present the media to other users for promotional purposes such as "see how well your dog will look like if it is fed with this food." In another example, a user may be viewing an electronic music keyboard, wherein the service provider presents one or more media files (e.g., music recordings) for users to listen to and see what kind of music have people created using that electronic music keyboard. In some instances, the electronic music keyboard may be recognized from device information included with the media files created using the electronic music keyboard. Alternatively, the keyboard may be recognized by comparing the sounds (e.g., musical notes) utilized to create the media file against sounds known to belong to sound banks of certain keyboards, wherein the comparison may be accomplished by comparing the spectra of the sounds in the music file and the samples in the sound bank and declaring a match if a certain range (e.g., majority) of matching sound spectra are found.

In one embodiment, the system 100 causes, at least in part, an association of the one or media files, one or more content files, or a combination thereof, with descriptive information associated with the at least one product. In one example, the service provider receives and associates one or more comments, ratings, rankings, testimonials, quality information, user experience, and the like, from a user.

In one embodiment, the system 100 determines at least one search term associated with the at least one product. In one embodiment, the service provider determines at least one search term (e.g., information item, tag, etc.) from a product listing, from a media file, from a metadata, and the like, associated with the at least one product; for example, a product name, a product model number, and the like, which may be utilized in conducting one or more searches for the at least one product.

In one embodiment, the system 100 causes a querying of one or more storage repositories, one or more devices associated with the user, or a combination thereof for the one or more media files, the one or more content files, or a combination thereof based, at least in part, on the at least one search term. In various embodiments, the service provider utilizes the at least one search term to conduct one or more searches for the one or more media files, the one or more content files, and the like, for example, at one or more storage repositories (e.g., cloud storage), one or more content providers, one or more other service providers, and the like. In one embodiment, if there are several candidate media and/or content files, the service provider may apply one or more algorithms to select the most suitable media and/or content files. For example, if the at least one product is a camera, then there may be one or more additional definitions/parameters set by the user, by the content provider and/or by the service provider, which can request/suggest to select best possible quality images, wherein the quality may be defined in terms of sharpness and quality of illumination, which may be determined from the media content utilizing known methods of image content analysis. In one embodiment, the processing platform and/or the content provider may apply a face detection technique to the media (e.g., images) so to exclude any media that may contain faces from being uploaded to the service provider, wherein this method can help to ensure privacy of persons in the media. In one embodiment, the service provider may prefer to receive raw image files (e.g., without any compression) as they may be more useful for comparison with other images. In one embodiment, the service provider may present to the user one or more available media files before retrieving them so the user may choose to accept/decline the one or more available media items for retrieval by the service provider.

In one embodiment, the system 100 determines one or more credentials for accessing the one or more storage repositories, the one or more devices, or a combination thereof from the user. In one embodiment, a service provider determines one or more credentials from a user account information and/or user information provided by the user in order to access the one or more storage repositories (e.g., a media sharing site), the one or more devices, and the like.

In one embodiment, the system 100 causes, at least in part, a generation of at least one request for permission to (a) access the one or more media files, the one or more content files, or a combination thereof; (b) cause the association of the one or more media files, the one or more content files, or a combination thereof with the descriptive information; or (c) a combination thereof, wherein the association of the one or more media files, the one or more content files, or a combination thereof with the descriptive information is based, at least in part, on one or more responses from the user to the at least one request. In one embodiment, the service provider generates and submits a request to the user for permission to access the one or more media and/or content files, which may be available via one or more user devices, one or more storage repositories (e.g., at a service provider), and the like. In another embodiment, the request for permission is to associate the descriptive information with the one or more media files, the one or more content files, or a combination thereof. For example, the service provider may retrieve one or more media files, one or more content files, and/or one or more descriptive information items, and with user's permission, can associate them with the product and the user. In one use case scenario, when the user clicks on a button to indicate that he owns a product, the service provider prompts/asks the user for permission to search for media/content files created by the user and/or via the product. Further, if the user grants permission, the service provider may contact/utilize one or more media/content sharing services (e.g., such as image sharing services) to search for media/content related to the product. In another embodiment, one or more applications (e.g., widgets, client apps, etc.) on a user device (e.g., computer, mobile phone, etc.) may be utilized to search for the one or more media/content files on the user device.

In one embodiment, the system 100 causes a presentation of the descriptive information, the one or more media files, the one or more content files, or a combination thereof to at least one other user. In one example, one or more other users such as social networking contacts, friends, family members, and the like, may be presented with the descriptive information, the one or more media files, the one or more content files, or a combination thereof. In one embodiment, the one or more other users may be determined by the user, by the service provider, and the like. For example, a user reviews a product at a service provider's web site and based on one or more privacy/security parameters (e.g., user login), the user may be presented with product information (e.g., media, content, descriptive, etc.), and/or information associated with another user, wherein the presented information may be useful to the user (e.g., may consider buying). In one embodiment, the service provider may detect the type of device utilized by a user to access/view content at the service provider's site (e.g., online merchant), wherein the service provider can present the content according to the detected device. For example, when presenting a user created image onto a small display on the user device, the service provider selects a part of the original content (e.g. crops an image) to show, at a 1:1 size ratio on the small display, a particular detail of the image which may be obtained by analyzing metadata of the image file (e.g. to identify a region with a particularly sharp contrast in the visual details) and/or the detail may be determined by the service provider to highlight presence or absence of distortion (e.g., noise) in the image, quality of artificial lightning, and the like. In one embodiment, one or more media/content files may be available from multiple users, which may be organized based on location. For example, the service provider may present and showcase how different users have used a same camera model to produce various images of an object at a same location, wherein the presentation of the various images and locations may be prioritized based on determined relevance for a user viewing the camera at a service provider's site. In various embodiments, the service provider may select one or more combinations of media/content files (e.g., photos, video, audio, etc.) associated with a same target/object and different products. For example, different pictures of a same statue at a same location, created via different and/or same cameras, with different and/or same settings, by different and/or same users, and the like. In various embodiments, metadata associated with the media/content files are utilized to determine various parameters associated with the media/content; for example, user ID, location information, time of day, date, compass direction, and the like. In another example, a user may be viewing an electronic music keyboard, wherein the service provider presents one or more musical audio recordings, which were created by one or more other users using that electronic music keyboard (e.g., the musical audio selections include metadata indicating that particular electronic music keyboard). In one embodiment, the system 100 determines the at least one other user based, at least in part, on social proximity information, privacy information, user preference information, or a combination thereof. In one example, the service provider may utilize one or more information items (e.g., from user login and/or user profile information) such as social proximity, privacy, user preference, and the like, for determining one or more other users associated (e.g., family, friend, colleague, classmate, etc.) with the user. In one embodiment, the service provider may present one or more diagrams showing one or more users' social relationships.

In one embodiment, the system 100 processes and/or facilitates a processing of the one or more media files, the one or more content files, related metadata, or a combination thereof to cause, at least in part, a verification that the one or more media files, the one or more content files, or a combination thereof were created via the at least one product. In one example, the system 100 processes a media file (e.g., a photo) and associated metadata (e.g., device ID, time, date, user info, etc.) to determine if the media file was created by a certain product (e.g., a particular camera model). In another example, a document and associated metadata is processed to determine if the document was created via a certain software program and/or on a certain user device (e.g., a certain personal computer). In one embodiment, the service provider determines one or more settings associated with the at least one product, which was utilized to create the one or more media files, the one or more content files, and the like. For instance, it would be beneficial to know settings of a camera when evaluating a media created via the camera. In another example, settings of an air-mattress (e.g., pressure) and user information (e.g., weight, height, etc.) can be useful when another user is reviewing the product and the associated information. In another example, an exercise equipment set (e.g., a home gym) is associated with a photo of the exercise equipment setup/settings and pictures of the user before and after using the exercise equipment along with user example test measurements (e.g., body fat) measured by various sensors (e.g., on a user device), thus providing media, content and information via one or more devices. In one embodiment, product setting information may be determined from retrieved metadata and displayed with a media/content associated with the product. In one embodiment, the service provider may retrieve one or more media and/or content files created by one or more combinations of one or more products (e.g. a camera plus a certain type of lens).

In one embodiment, the system 100 processes and/or facilitates a processing of the one or more media files, the one or more content files, one or more messages associated with the user, or a combination thereof to determine that the user is associated with the at least one product, wherein the association of the one or more media files, the one or more content files, or a combination thereof is based, at least in part, on the verification. For example, once the verification is completed, a media file (e.g., a photo) of a product, a content associated with the product (e.g., a video captured via the product), and any other information (e.g., a user testimonial), and the like, are associated with the user. In one example, a user is associated with a camera, a photo of the camera and the user, a photo created via the camera, and user experience comments by the user are associated with the user and/or with a user account at a service provider.

In one embodiment, the system 100 determines ranking information for the user based, at least in part, on the verification. In one embodiment, a user is ranked based on number of products, media, content, information, and the like are verified and associated with the user. In one embodiment, a user may have a high ranking for having multiple verified and associated products, media, content, and information. In another embodiment, a user may have a high ranking for having multiple other users access, view, comment on, etc., the products and the product information associated with the user. In another embodiment, a user who has obtained high rankings (e.g., by providing a number of product testimonials) may be given an honorary title such as "Gadget King" by the system 100 and/or by other users, wherein these titles may be associated with and/or displayed in the user's profile.

In one embodiment, the system 100 determines that the at least one product has connectivity to a device associated with the user, wherein the one or more media files, the one or more content files, one or more characteristics of the at least one product, or a combination thereof is obtained over the connectivity. In one example, various products (e.g., a camera, a mobile phone, a television set, a refrigerator, a mattress, a couch, etc.) may share/provide one or more characteristics of the various products via one or more connections (e.g., wireless, wired, Radio Frequency Identification (RFID), Near Field Communication (NFC), etc.) with one or more devices (e.g., a personal computer, a mobile phone, etc.) associated with the user. For example, an RFID tag attached to a mattress may provide one or more information items (e.g., make, model, comfort level, cushion, construction, etc.) associated with the mattress to a mobile phone of the user of the mattress.

As shown in FIG. 1, in one embodiment, the system 100 includes user equipment (UE) 101*a*-101*n* (also collectively referred to as UE 101), which may be utilized to execute one or more applications 103*a*-103*n* (also collectively referred to as applications 103) (e.g., a social networking application, a web browser, a media application, user interface, GPS, a mapping application, a web client, etc.) to communicate with other UEs 101, a processing platform 105, a services platform 107, a content provider 109, and/or with other components (e.g., a GPS satellite) of a communication network directly and/or over a communication network 111. In one embodiment, the services platform 107 may include one or more services 113*a*-113*k* (also collectively referred to as services 113), which may provide one or more services (e.g., online shopping, online product evaluations, social networking, etc.). In one embodiment, the processing platform 105 may include and/or have access to a user/product database 115 to access and/or store information associated with the users and/or the products, media, media recognition models, and the like. In one embodiment, the services 113 may obtain content (e.g., media content, product information, etc.) from the content provider 109 and then offer the content to the UE 101, to the processing platform 105, and/or to one or more other services or entities of the system 100. It is noted that the processing platform 105 may be a separate entity in the system 100, a part of the services 113, a part of the services platform 107, a part of the content provider 109, included within the UE 101 (e.g., as part of the applications 103), or a combination thereof. Further, one or more components of the system 100 may directly or indirectly communicate with one or more other components of the system 100 via the communication network 111 and/or via other communication channels.

In one embodiment, the UE 101 includes a location module/sensor that can determine the UE 101 location (e.g., a user's location). The UE 101 location can be determined by a triangulation system such as a global positioning system (GPS), assisted GPS (A-GPS), Cell of Origin, wireless local area network triangulation, or other location extrapolation technologies. Standard GPS and A-GPS systems can use satellites 117 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., WLAN) connection to determine the UE 101 location information, for example, from an Internet source (e.g., a service provider).

In one embodiment, the services platform 107 may include one or more service providers offering one or more services, for example, online shopping, social networking services (e.g., blogging), media upload, media download, media streaming, account management services, or a combination thereof. Further, the services platform 107 may conduct a search for content, media, information, and the like associated with one or more users and/or one or more products. In certain embodiments, the processing platform 105 is implemented as a collection of one or more hardware, software, algorithms, firmware, or combinations thereof that can be integrated for use with the services platform 107 and/or with the content provider 109. In various embodiments, the processing platform 105 can be maintained on a network server, while operating in connection with the services platform 107 and/or with the content provider 109 as an extensible feature, a web-service, an applet, a script, an object-oriented application, or the like to enable searching for and/or processing of the social networking information. Further, the processing platform 105, the services platform 107, and/or the content provider 109 may utilize one or more service application programming interfaces (APIs)/integrated interface, through which communication, media, content, and information (e.g., associated with users and products) may be shared, accessed and/or processed.

In one embodiment, the processing platform 105, the services platform 107, and/or the content provider 109 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

By way of example, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UEs 101, the processing platform 105, the services platform 107, and the content provider 109 communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
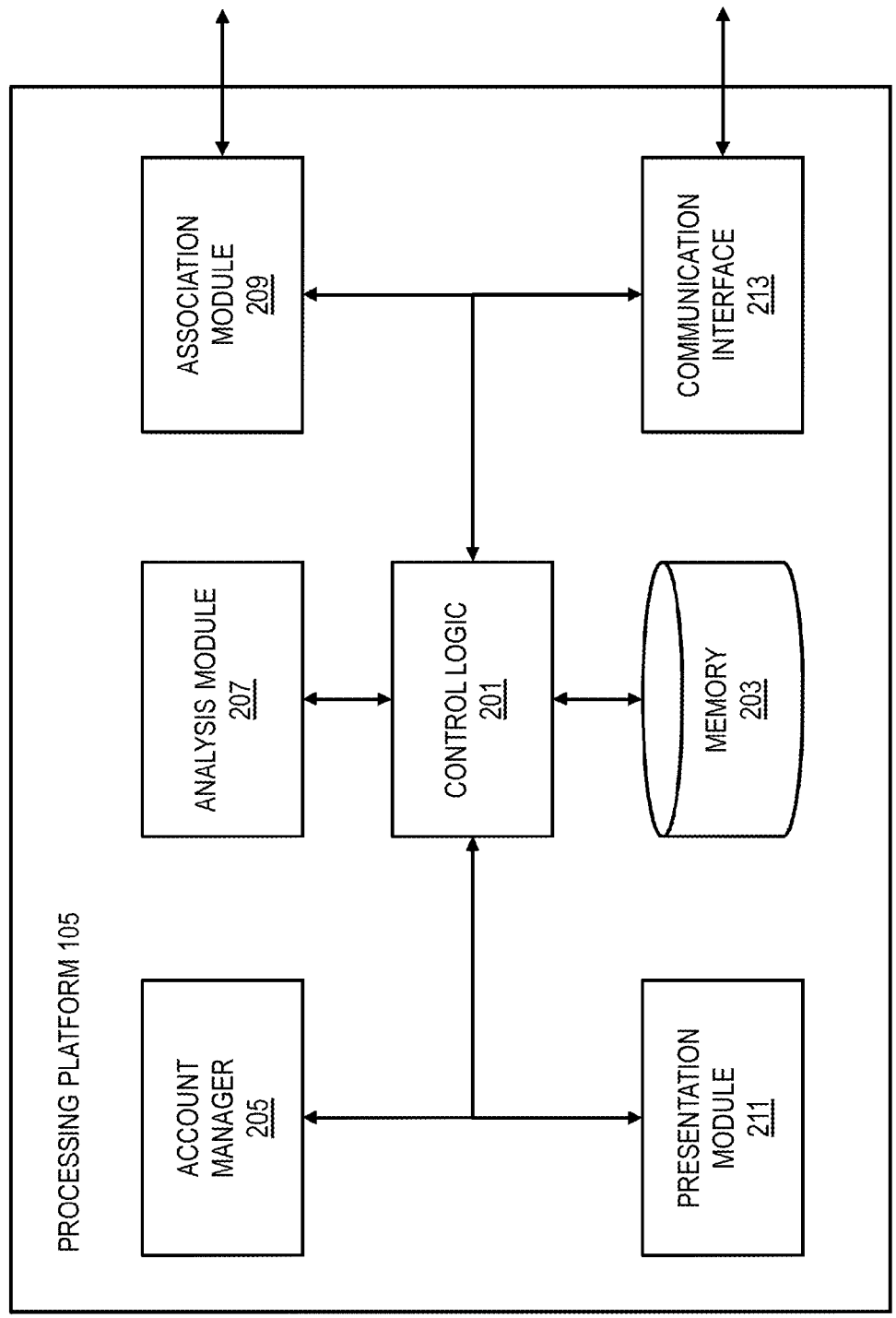
FIG. 2 is a diagram of the components of a processing platform, according to one embodiment.

FIG. 2 is a diagram of the components of a processing platform, according to one embodiment. By way of example, the processing platform 105 includes one or more components for analyzing and processing user and/or product information. It is contemplated that the functions of these components may be combined in one or more components or performed by other components of equivalent functionality. In this embodiment, the processing platform 105 includes control logic (or processor) 201, memory 203, an account manager 205, an analysis module 207, an association module 209, a presentation module 211, and a communication interface 213.

The control logic 201 executes at least one algorithm, software, application, and the like for executing functions of the processing platform 105. For example, the control logic 201 may interact with the account manager 205 to receive a request to register a user, one or more media, and/or content files, and/or descriptive information associated with at least one product associated with the user. The descriptive information may include user testimonial, comment, experience, rating, and the like. In determining whether to complete the registration request, the account manager 205 may process information associated with the user, such as the user's account information, user status, user ranking, privacy policy, security policy, etc. If, for instance, it is determined that the user satisfies the requirements of the service provider, the account manager 205 may then register and associate the user with the at least one product and other related information.

As such, the account manager 205 may work with the analysis module 207, via the control logic 201, to process the user and product information to generate a user profile and/or add new product information to an account already associated with the user. As discussed, the media, content and information associated with the product and/or the user may be captured (e.g., via a sound recorder, a camera, a camcorder, etc.) or retrieved from a local or remote database (e.g., a search database, a social networking database, etc.), a content provider, a user device, another service provider, and the like.

Next, the control logic 201 may then direct the association module 209 to associate together the user, the one or more media and/or content files, the descriptive information, and the at least one product. Consequently, the presentation module 211 may present all or a portion of the one or more media/content and/or descriptive information to other users based, at least in part, on the privacy and/or security policies associated with the user and/or the other users. Further, the processing platform 105 may share all or a portion of the one or more product content and/or descriptive information with one or more service providers (e.g., merchants), content providers, and the like based, at least in part, on the privacy and/or security policies.

The control logic 201 may also utilize the communication interface 213 to communicate with other components of the processing platform 105, the UEs 101, the services platform 107, the content provider 109, and other components of the system 100. For example, the communication interface 213 may transmit a notification to a user's device to indicate whether the user request has been registered with one or more service providers (e.g., merchants). The communication interface 213 may further include multiple means of communication. In one use case, the communication interface 213 may be able to communicate over SMS, internet protocol, instant messaging, voice sessions (e.g., via a phone network), or other types of communication.

Figure 3:
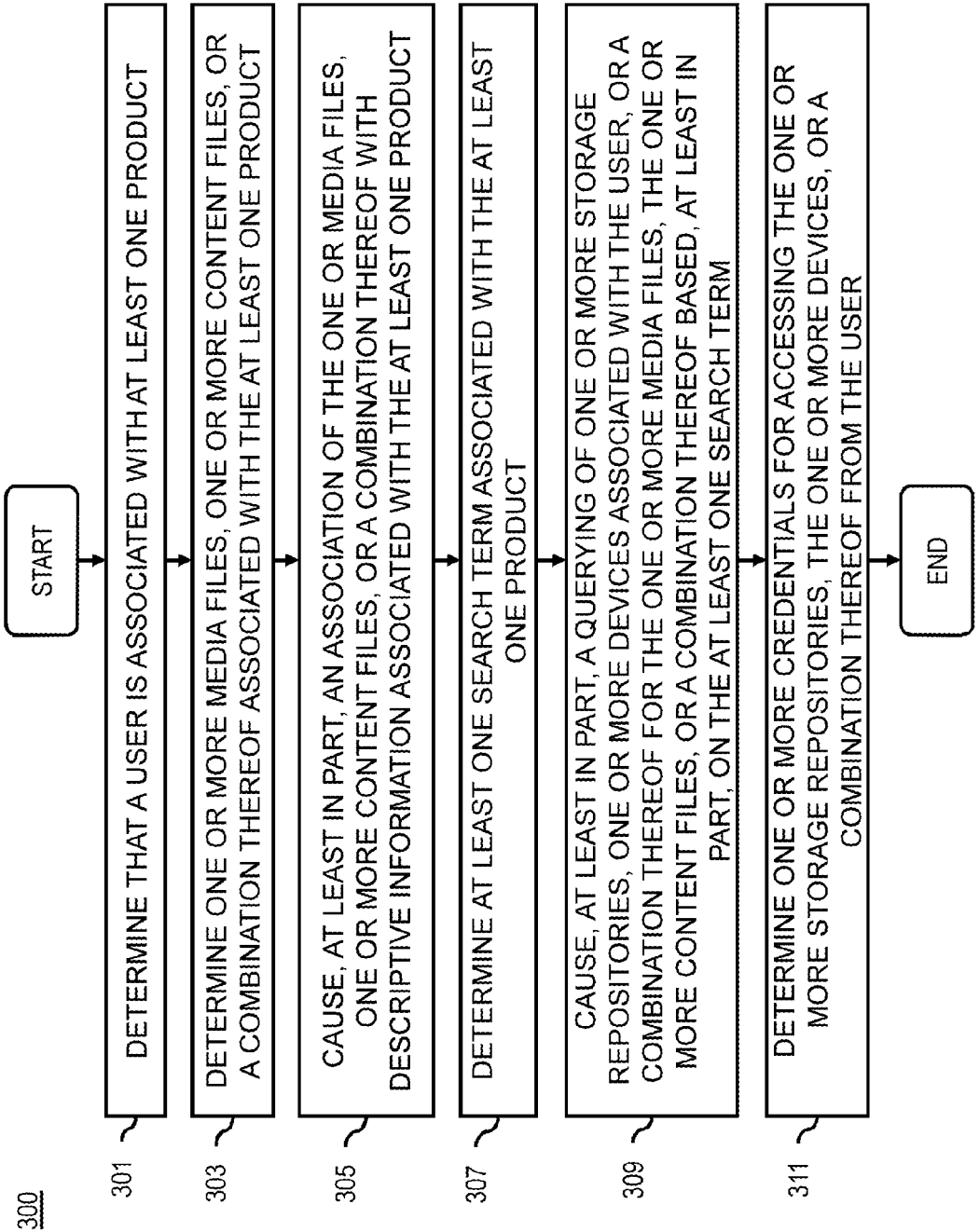
FIG. 3 is a flowchart of a process for verifying association of users with products and product information, according to one embodiment.
Figure 8:
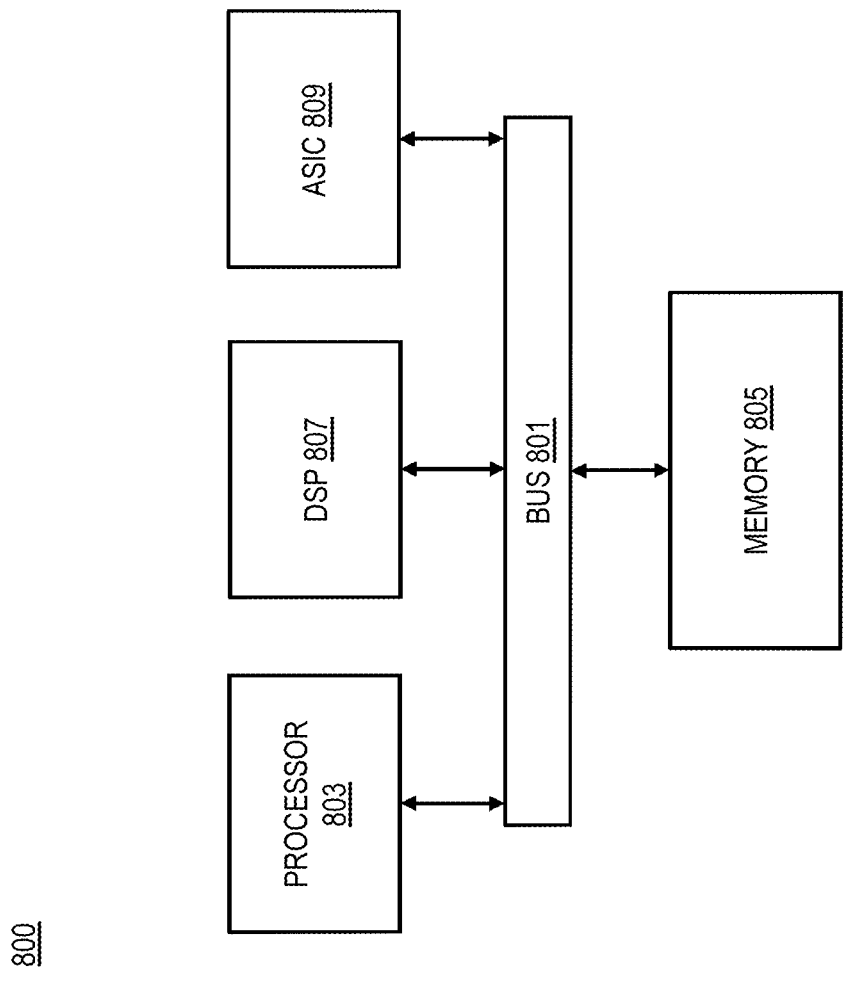
FIG. 8 is a diagram of a chip set that can be used to implement an embodiment of the invention.

FIG. 3 is a flowchart of a process for verifying association of users with products and product information, according to one embodiment. In one embodiment, the processing platform 105 performs the process 300 and is implemented in, for instance, a chip set including a processor and a memory as shown in FIG. 8. As such, the control logic 201 can provide means for accomplishing various parts of the process 300 as well as means for accomplishing other processes in conjunction with other components of the processing platform 105.

In step 301, the processing platform 105 determines that a user is associated with at least one product. In one embodiment, the processing platform 105 (e.g., an online merchant, a service provider) receives an indication (e.g., a message via a web browser) from a user indicating that the user is associated (e.g., owns, has experience) with at least one product. In one embodiment, the processing platform 105 receives a message from the user, wherein the user finds a product of interest in an online catalog and utilizes a UI feature (e.g., a button) to indicate "I own this product" and in another example, the UI may have one or more features for indicating various possibilities such as "I have experience with this product," "I had this product," and the like. In one embodiment, the processing platform 105 may receive a listing of one or more products, a media file including one or more images of one or more products, and the like, which are associated with a user. In one embodiment, the processing platform 105 may receive an indication/message from a user indicating one or more combinations of one or more products (e.g. a camera plus a certain type of lens). In one embodiment, the processing platform 105 has access to a compilation of different products a user owns or has experience with; for example, a camera 1 with a lens 1; and upon subsequent visits/searches by the user for one or more compatible products (e.g. for other camera lenses), the processing platform 105 may present one or more comparisons of one or more related products based on one or more available product information (e.g., by other users, ratings, testimonial, etc.) to the user's current product such as the camera 1 with a lens 2, the camera 1 with a lens 3, and the like. In one embodiment, the processing platform 105 may compile and store one or more information (e.g., a serial number) of each product, so when a product is sold/transferred to a new owner, the previous media, and/or content from the product's original owner may still be accessible.

In step 303, the processing platform 105 determines one or more media files, one or more content files, or a combination thereof associated with the at least one product. In one embodiment, the processing platform 105 one or more media files, which may include one or more images associated with the at least one product. For example, a media file including an image of a television set owned by the user. In another embodiment, the processing platform 105 receives one or more content files associated with at least one product, for example, a content file (e.g., a photo file) from a camera owned by the user. In another embodiment, a media file includes one or more product identification information items such as a barcode, a photo of packaging of the product, and the like. In one embodiment, the processing platform 105 utilizes context information associated with a product reference. For example, a user may be browsing a dog food product page and may indicate "I use this product," wherein the processing platform 105 obtains information from the description of the product that this is a dog food product and the media/content/images to be searched/retrieved should contain an indicator/tag related to "dog." Further, the processing platform 105 may retrieve all media (e.g., pictures) including a dog and/or the indicator/tag "dog," and present the media to other users for promotional purposes such as "see how well your dog will look like if it is fed with this food." In another example, a user may be viewing an electronic music keyboard, wherein the processing platform 105 presents one or more media files (e.g., music recordings) for users to listen to and see what kind of music have people created using that electronic music keyboard. In some instances, the electronic music keyboard may be recognized from device information included with the media files created using the electronic music keyboard. Alternatively, the keyboard may be recognized by comparing the sounds (e.g., musical notes) utilized to create the media file against sounds known to belong to sound banks of certain keyboards, wherein the comparison may be accomplished by comparing the spectra of the sounds in the music file and the samples in the sound bank and declaring a match if a certain range (e.g., majority) of matching sound spectra are found.

In step 305, the processing platform 105 causes, at least in part, an association of the one or media files, one or more content files, or a combination thereof with descriptive information associated with the at least one product. In one example, the processing platform 105 receives and associates one or more comments, ratings, rankings, testimonials, quality information, user experience, and the like, from a user.

In step 307, the processing platform 105 determines at least one search term associated with the at least one product. In one embodiment, the processing platform 105 determines at least one search term (e.g., information item, tag, etc.) from a product listing, from a media file, from a metadata, and the like, associated with the at least one product; for example, a product name, a product model number, and the like, which may be utilized in conducting one or more searches for the at least one product.

In step 309, the processing platform 105 causes, at least in part, a querying of one or more storage repositories, one or more devices associated with the user, or a combination thereof for the one or more media files, the one or more content files, or a combination thereof based, at least in part, on the at least one search term. In various embodiments, the processing platform 105 utilizes the at least one search term to conduct one or more searches for the one or more media files, the one or more content files, and the like, for example, at one or more storage repositories (e.g., cloud storage), one or more content providers, one or more other service providers, and the like. In one embodiment, if there are several candidate media and/or content files, the processing platform 105 may apply one or more algorithms to select the most suitable media and/or content files. For example, if the at least one product is a camera, then there may be one or more additional definitions/parameters set by the user, by the content provider and/or by the processing platform 105, which can request/suggest to select best possible quality images, wherein the quality may be defined in terms of sharpness and quality of illumination, which may be determined from the media content utilizing known methods of image content analysis. In one embodiment, the processing platform and/or the content provider may apply a face detection technique to the media (e.g., images) so to exclude any media that may contain faces from being uploaded to the processing platform 105, wherein this method can help to ensure privacy of persons in the media. In one embodiment, the processing platform 105 may prefer to receive raw image files (e.g., without any compression) as they may be more useful for comparison with other images. In one embodiment, the processing platform 105 may present to the user one or more available media files before retrieving them so the user may choose to accept/decline the one or more available media items for retrieval by the processing platform 105.

In step 311, the processing platform 105 determines one or more credentials for accessing the one or more storage repositories, the one or more devices, or a combination thereof from the user. In one embodiment, the processing platform 105 determines one or more credentials from a user account information and/or user information provided by the user in order to access the one or more storage repositories (e.g., a media sharing site), the one or more devices, and the like.

Figure 4:
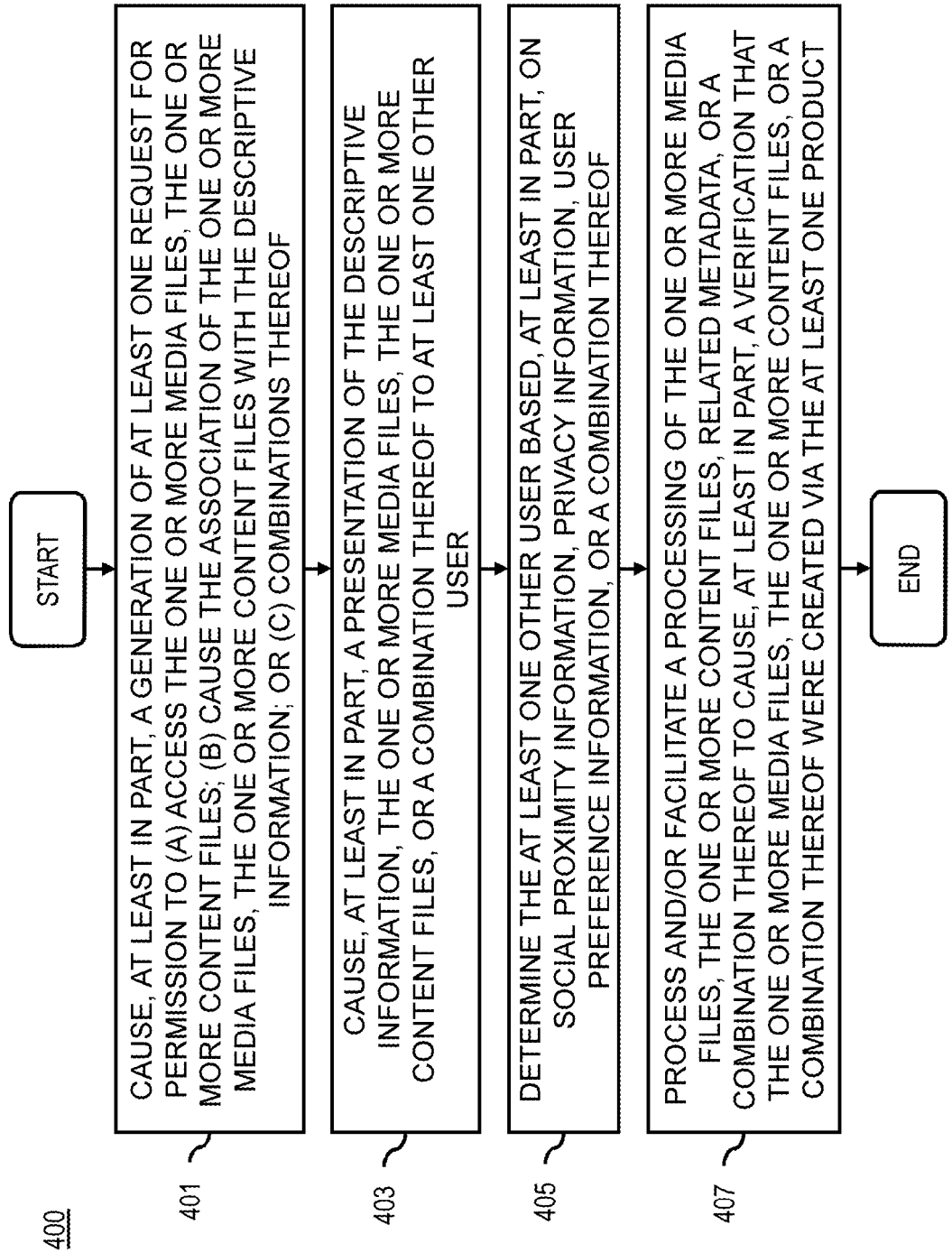
FIG. 4 is a flowchart of a process for generating a request for a permission to access, process, and present content and information related to a product, according to one embodiment.

FIG. 4 is a flowchart of a process for generating a request for permission to access, process, and present content and information related to a product, according to one embodiment. In one embodiment, the processing platform 105 performs the process 400 and is implemented in, for instance, a chip set including a processor and a memory as shown in FIG. 8. As such, the control logic 201 can provide means for accomplishing various parts of the process 400 as well as means for accomplishing other processes in conjunction with other components of the processing platform 105.

In step 401, the processing platform 105 causes, at least in part, a generation of at least one request for permission to (a) access the one or more media files, the one or more content files, or a combination thereof; (b) cause the association of the one or more media files, the one or more content files, or a combination thereof with the descriptive information; or (c) a combination thereof, wherein the association of the one or more media files, the one or more content files, or a combination thereof with the descriptive information is based, at least in part, on one or more responses from the user to the at least one request. In one embodiment, the processing platform 105 generates and submits a request to the user for permission to access the one or more media and/or content files, which may be available via one or more user devices, one or more storage repositories (e.g., at a service provider), and the like. In another embodiment, the request for permission is to associate the descriptive information with the one or more media files, the one or more content files, or a combination thereof. For example, the processing platform 105 may retrieve one or more media files, one or more content files, and/or one or more descriptive information items, and with user's permission, can associate them with the product and the user. In one use case scenario, when the user clicks on a button to indicate that he owns a product, the processing platform 105 prompts/asks the user for permission to search for media/content files created by the user and/or via the product. Further, if the user grants permission, the processing platform 105 may contact/utilize one or more media/content sharing services (e.g., such as image sharing services) to search for media/content related to the product. In another embodiment, one or more applications (e.g., widgets, client apps, etc.) on a user device (e.g., computer, mobile phone, etc.) may be utilized to search for the one or more media/content files on the user device.

In step 403, the processing platform 105 causes, at least in part, a presentation of the descriptive information, the one or more media files, the one or more content files, or a combination thereof to at least one other user. In one example, one or more other users such as social networking contacts, friends, family members, and the like, may be presented with the descriptive information, the one or more media files, the one or more content files, or a combination thereof. In one embodiment, the one or more other users may be determined by the user, by the processing platform 105, and the like. For example, a user reviews a product at a service provider's web site and based on one or more privacy/security parameters (e.g., user login), the user may be presented with product information (e.g., media, content, descriptive, etc.), and/or information associated with another user, wherein the presented information may be useful to the user (e.g., may consider buying). In one embodiment, the processing platform 105 may detect the type of device utilized by a user to access/view content at a service provider's site (e.g., online merchant), wherein the processing platform 105 can present the content according to the detected device. For example, when presenting a user created image onto a small display on the user device, the processing platform 105 selects a part of the original content (e.g. crops an image) to show, at a 1:1 size ratio on the small display, a particular detail of the image which may be obtained by analyzing metadata of the image file (e.g. to identify a region with a particularly sharp contrast in the visual details) and/or the detail may be determined by the processing platform 105 to highlight presence or absence of distortion (e.g., noise) in the image, quality of artificial lightning, and the like. In one embodiment, one or more media/content files may be available from multiple users, which may be organized based on location. For example, the processing platform 105 may present and showcase how different users have used a same camera model to produce various images of an object at a same location, wherein the presentation of the various images and locations may be prioritized based on determined relevance for a user viewing the camera at a service provider's site. In various embodiments, the processing platform 105 may select one or more combinations of media/content files (e.g., photos, video, audio, etc.) associated with a same target/object and different products. For example, different pictures of a same statue at a same location, created via different and/or same cameras, with different and/or same settings, by different and/or same users, and the like. In various embodiments, metadata associated with the media/content files are utilized to determine various parameters associated with the media/content; for example, user ID, location information, time of day, date, compass direction, and the like. In another example, a user may be viewing an electronic music keyboard, wherein the processing platform 105 presents one or more musical audio recordings, which were created by one or more other users using that electronic music keyboard (e.g., the musical audio selections include metadata indicating that particular electronic music keyboard).

In step 405, the processing platform 105 determines the at least one other user based, at least in part, on social proximity information, privacy information, user preference information, or a combination thereof. In one example, the processing platform 105 may utilize one or more information items (e.g., from user login and/or user profile information) such as social proximity, privacy, user preference, and the like, for determining one or more other users associated (e.g., family, friend, colleague, classmate, etc.) with the user. In one embodiment, the service provider may present one or more diagrams showing one or more users' social relationships.

In step 407, the processing platform 105 processes and/or facilitates a processing of the one or more media files, the one or more content files, related metadata, or a combination thereof to cause, at least in part, a verification that the one or more media files, the one or more content files, or a combination thereof were created via the at least one product. In one example, the processing platform 105 processes a media file (e.g., a photo) and associated metadata (e.g., device ID, time, date, user info, etc.) to determine if the media file was created by a certain product (e.g., a particular camera model). In another example, a document and associated metadata is processed to determine if the document was created via a certain software program and/or on a certain user device (e.g., a certain personal computer). In one embodiment, the processing platform 105 determines one or more settings associated with the at least one product, which was utilized to create the one or more media files, the one or more content files, and the like. For instance, it would be beneficial to know settings of a camera when evaluating a media created via the camera. In another example, settings of an air-mattress (e.g., pressure) and user information (e.g., weight, height, etc.) can be useful when another user is reviewing the product and the associated information. In another example, an exercise equipment set (e.g., a home gym) is associated with a photo of the exercise equipment setup/settings and pictures of the user before and after using the exercise equipment along with user example test measurements (e.g., body fat) measured by various sensors (e.g., on a user device), thus providing media, content and information via one or more devices. In one embodiment, product setting information may be determined from retrieved metadata and displayed with a media/content associated with the product. In one embodiment, the processing platform 105 may retrieve one or more media and/or content files created by one or more combinations of one or more products (e.g. a camera plus a certain type of lens).

Figure 5:
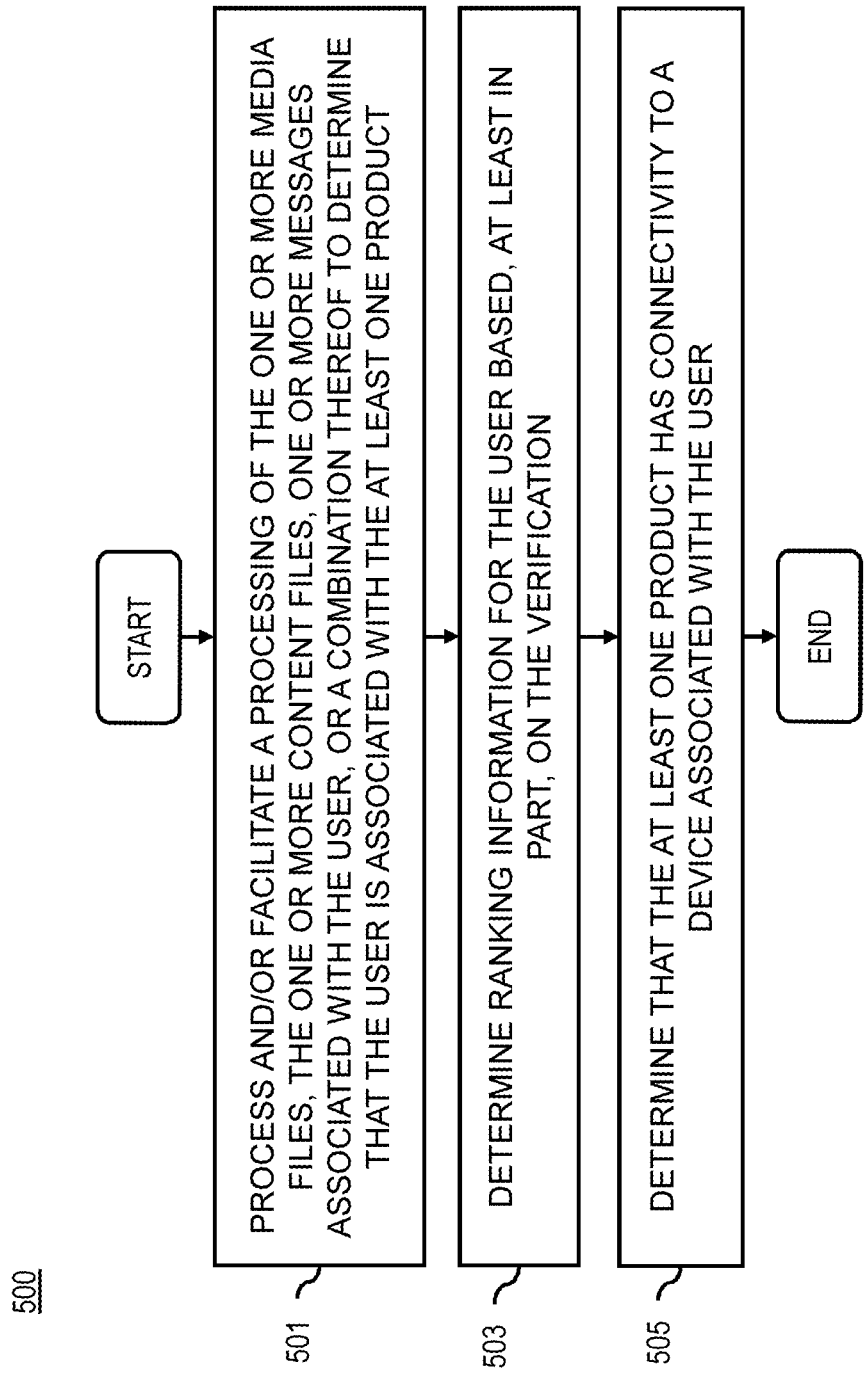
FIG. 5 is a flowchart of a process for processing media, content, and messages associated with a user, according to one embodiment.

FIG. 5 is a flowchart of a process for processing media, content, and messages associated with a user, according to one embodiment. In one embodiment, the processing platform 105 performs the process 500 and is implemented in, for instance, a chip set including a processor and a memory as shown in FIG. 8. As such, the control logic 201 can provide means for accomplishing various parts of the process 500 as well as means for accomplishing other processes in conjunction with other components of the processing platform 105.

In step 501, the processing platform 105 processes and/or facilitates a processing of the one or more media files, the one or more content files, one or more messages associated with the user, or a combination thereof to determine that the user is associated with the at least one product, wherein the association of the one or more media files, the one or more content files, or a combination thereof is based, at least in part, on the verification. For example, once the verification is completed, a media file (e.g., a photo) of a product, a content associated with the product (e.g., a video captured via the product), and any other information (e.g., a user testimonial), and the like, are associated with the user. In one example, a user is associated with a camera, a photo of the camera and the user, a photo created via the camera, and user experience comments by the user are associated with the user and/or with a user account at a service provider.

In step 503, the processing platform 105 determines ranking information for the user based, at least in part, on the verification. In one embodiment, a user is ranked based on number of products, media, content, information, and the like are verified and associated with the user. In one embodiment, a user may have a high ranking for having multiple verified and associated products, media, content, and information. In another embodiment, a user may have a high ranking for having multiple other users access, view, comment on, etc., the products and the product information associated with the user. In another embodiment, a user who has obtained high rankings (e.g., by providing a number of product testimonials) may be given an honorary title such as "Gadget King" by the system 100 and/or by other users, wherein these titles may be associated with and/or displayed in the user's profile.

In step 505, the processing platform 105 determines that the at least one product has connectivity to a device associated with the user, wherein the one or more media files, the one or more content files, one or more characteristics of the at least one product, or a combination thereof is obtained over the connectivity. In one example, various products (e.g., a camera, a mobile phone, a television set, a refrigerator, a mattress, a couch, etc.) may share/provide one or more characteristics of the various products via one or more connections (e.g., wireless, wired, RFID, NFC, etc.) with one or more devices (e.g., a personal computer, a mobile phone, etc.) associated with the user. For example, an RFID tag attached to a mattress may provide one or more information items (e.g., make, model, comfort level, cushion, construction, etc.) associated with the mattress to a mobile phone of the user of the mattress.

Figure 6A:
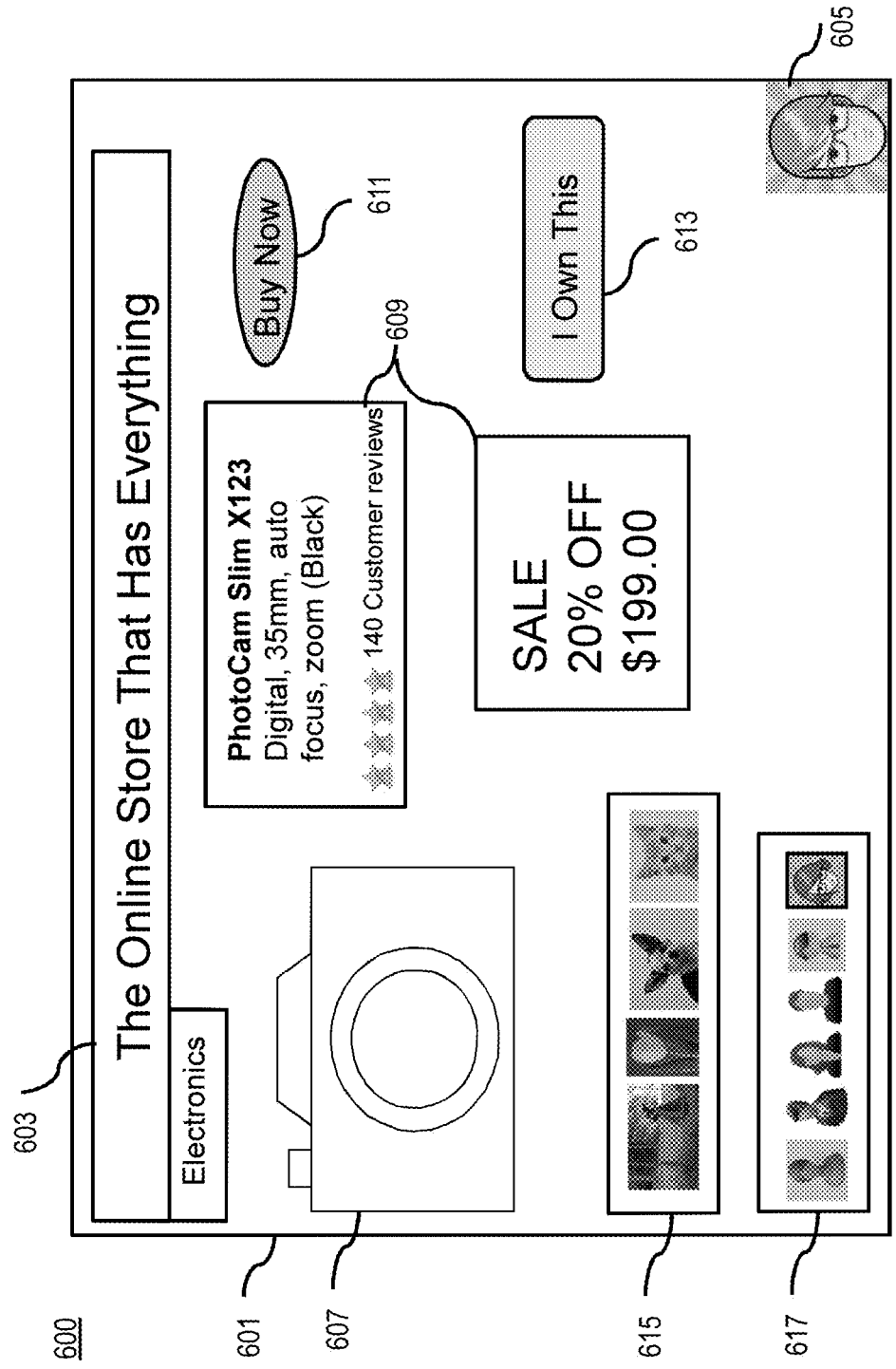
FIGS. 6A-6C are diagrams of a user interface utilized in the processes of FIGS. 3-5, according to various embodiments.
Figure 6B:
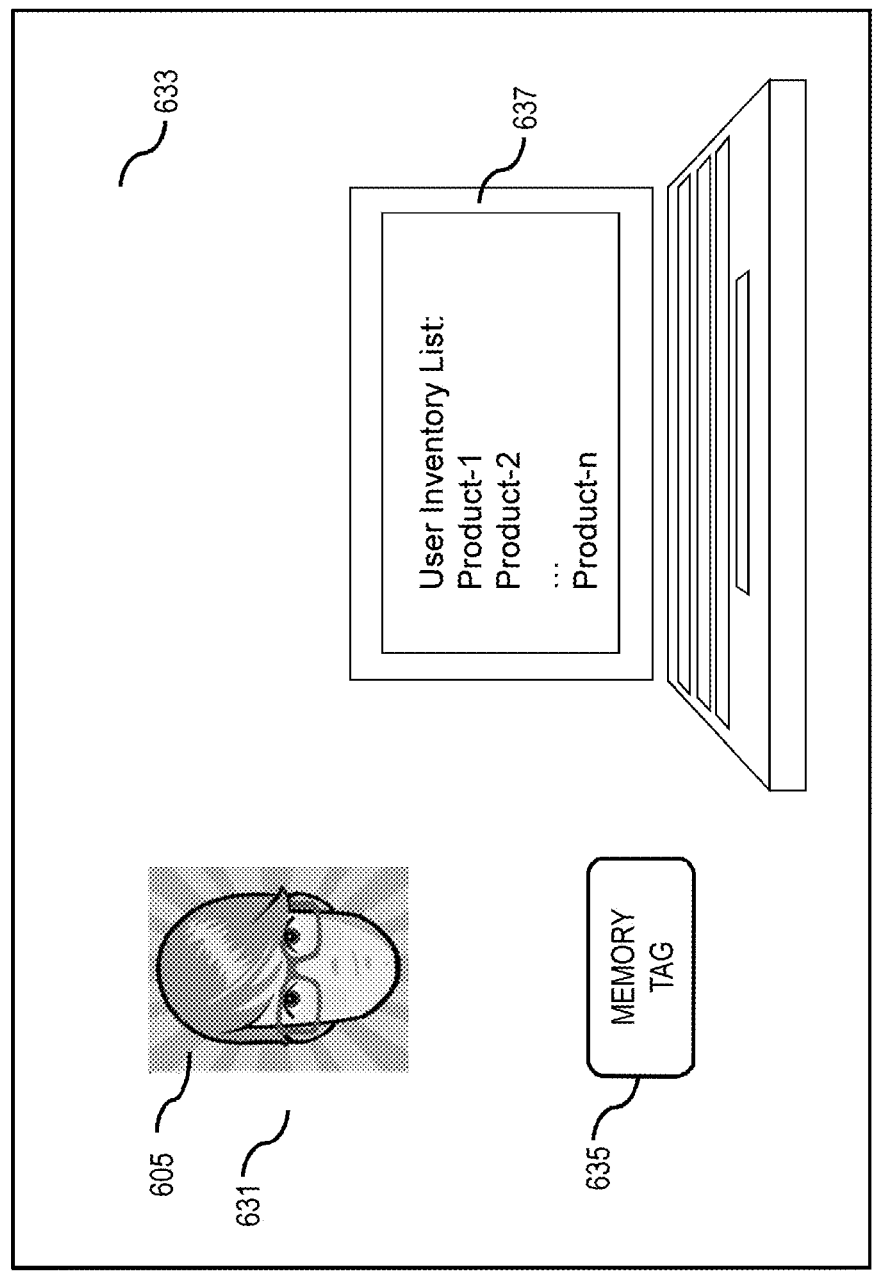
Figure 6C:
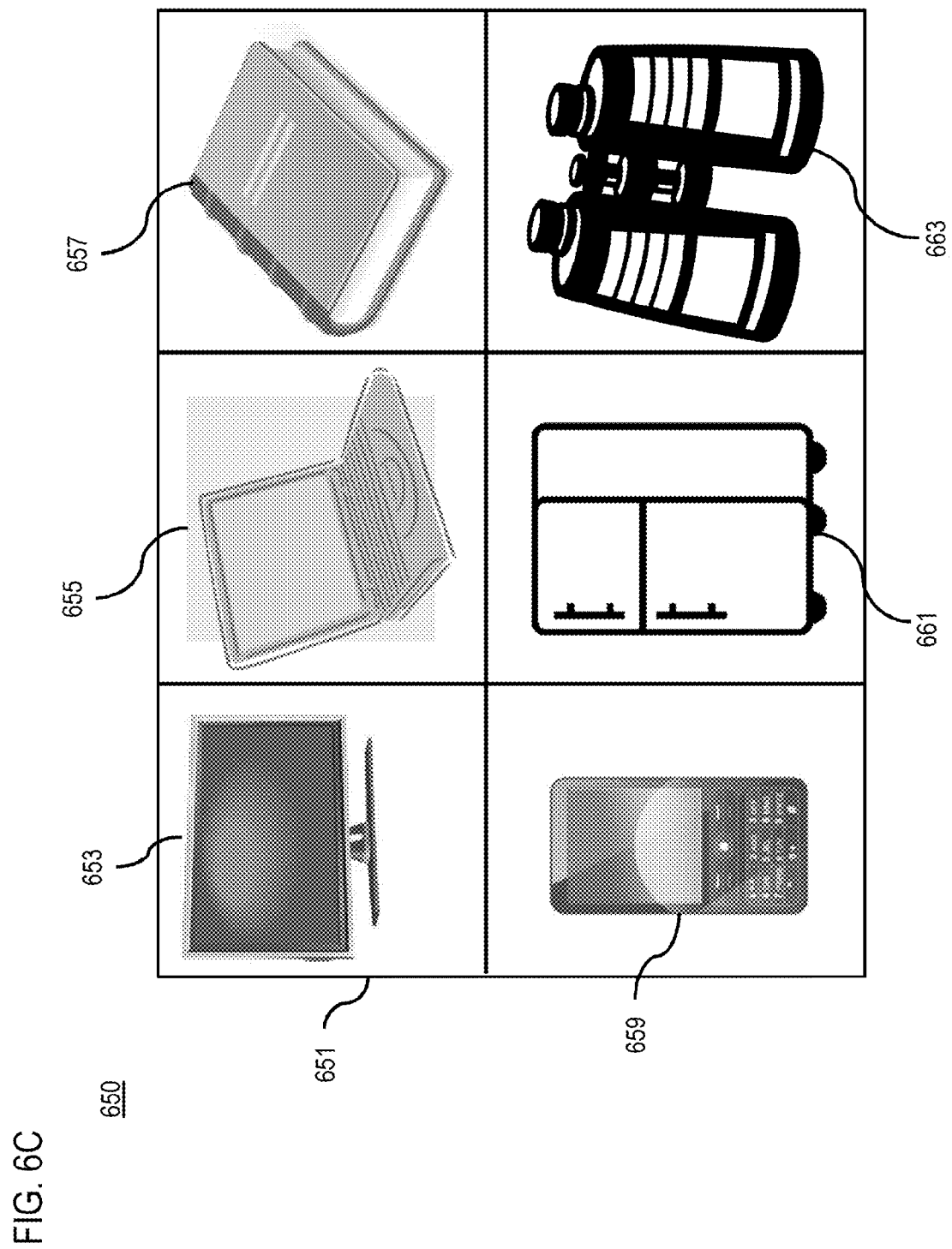

FIGS. 6A-6C are diagrams of user interfaces utilized in the processes of FIGS. 3-5, according to various embodiments. FIG. 6A features UI 600 showing an online merchant/service provider website 601 for an example service provider/merchant 603 "The Online Store That Has Everything." In one embodiment, user 605 is viewing a product 607 (e.g., a camera) with additional product information 609 such as model number, pricing, discounts, customer reviews, and the like. Further, the user 605 may make a selection 611 "Buy Now" to submit a request to purchase the product 607. Furthermore, the user 605 may select 613 "I Own this" to cause a message to the service provider 603 and indicate that the user 605 owns a same or a substantially same product (e.g., similar model number). Additionally, the service provider 603 may display one or more media/content items 615 associated with the product and may request from the user 605 one or more media/content items associated with the product owned by the user 605. In one embodiment, in addition to indicator 613, the user 605 may indicate that the user 605 has experience with the product 607 (e.g., has used it before, owned it before, etc.) In one embodiment, the service provider 603 may indicate one or more users 617 who are also associated with the product 607 (e.g., own it) and/or who are associated with the user 605 (e.g., friends, social networking contacts, colleagues, etc.), wherein the association between the user 605 and the one or more users 617 may be presented based, at least in part, on one or more settings such as privacy, security, user profile, user preference, and the like, defined by the user 605, the one or more users 617, the service provider 603, and/or one or more other services. In one embodiment, the one or more media/contents 615 may include one or more media/contents requested and retrieved from the user 605.

FIG. 6B illustrates various UIs 630 utilized in providing various user and product information to one or more service providers. Indicator 631 shows a user device which may be utilized to provide information (e.g., an image) associated with the user 605 to a service provider. Further, indicator 633 shows a barcode associated with a product, which may be provided by the user 605 and/or retrieved by the service provider 603 and may be utilized to determine one or more information, media, content, and the like, associated with a product. Similarly, memory tag 635 (e.g., RFID) may be associated with (e.g., included, attached to, etc.) a product and may be utilized to determine one or more information, media, content, and the like, associated with a product. Furthermore, the user 605 may provide a list similar to user inventory list 637 including information on one or more products (e.g., products-1 through products-n) associated with (e.g., owned by) the user 605. Such inventory list may be created when the user registers for the first time with the online store and/or with similar services. For example, the user 605 may provide the list 637 to track products owned and obtained by the user 605, wherein the list may be maintained and/or updated by the user and/or one or more service providers.

FIG. 6C illustrates media 650 including one or more items associated with one or more products. As shown, example media 651 (e.g., a photo) various images including an image of a television set 653, a computer 655, a book 657, a mobile phone 659, a refrigerator 661, and a pair of binoculars 663. In one embodiment, the one or more service and/or content providers may utilize one or more image detection techniques on the example media 651 to determine the one or more images and identify one or more products associated with the one or more images using, for example, image object segmentation, image analysis, and/or image object recognition methods. For example, the images may be first processed with an image object segmentation method which may segment possible objects from the image; then a set of visual features may be extracted from the segmented objects; and the extracted features may be then compared against features extracted from images of various products (such as TV sets) to find possible matches. For example, the user 605 may capture one or more photos of his office, his living room, his studio, his bedroom, and the like, in order to capture one or more products in each room, wherein the products may be detected and determined by one or more service providers for creating one or more lists of products associated with (e.g., owned by) the user 605.

The processes described herein for verifying association of users with products and product information may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
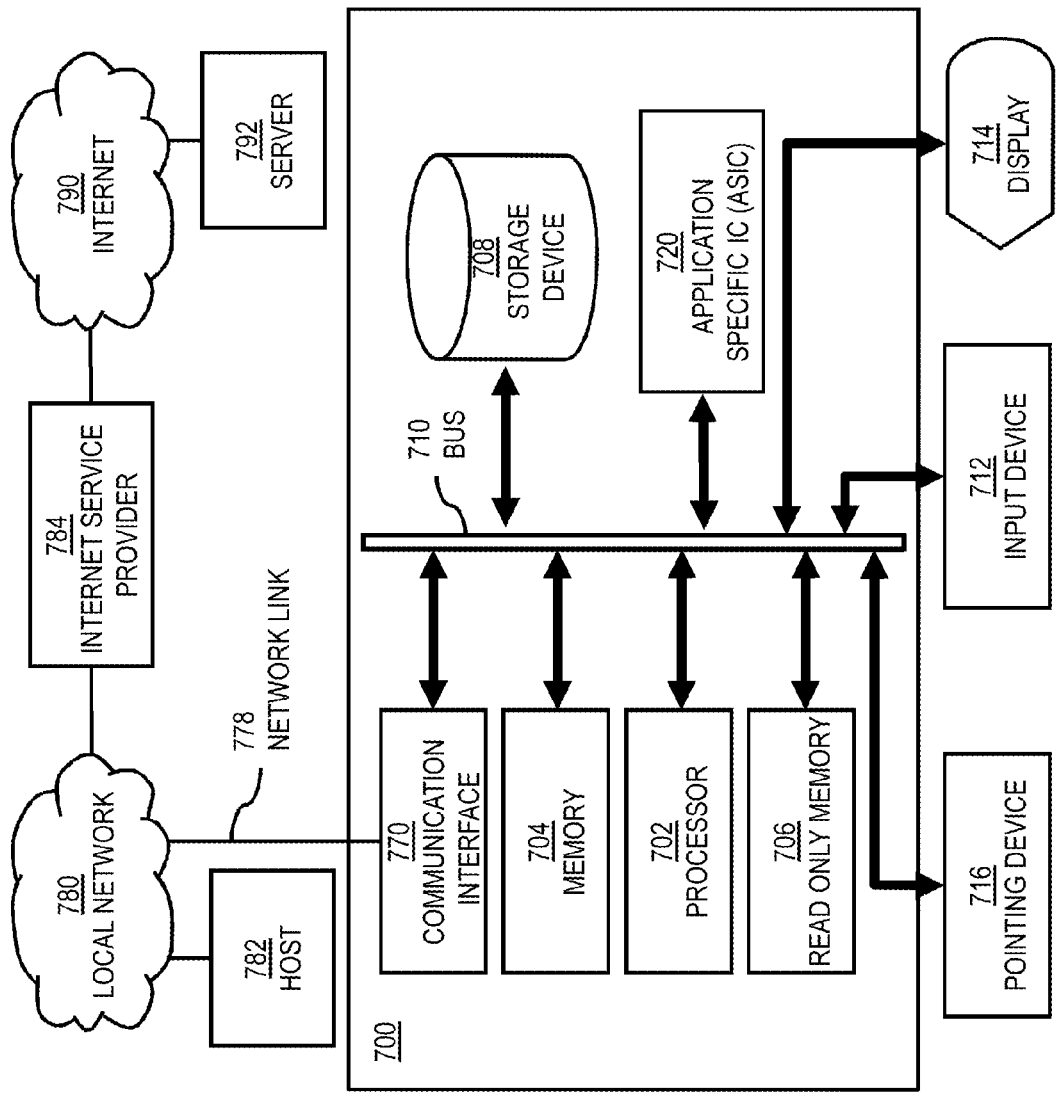
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to verify association of users with products and product information as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of verifying association of users with products and product information.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to verifying association of users with products and product information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for verifying association of users with products and product information. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for verifying association of users with products and product information, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 111 for verifying association of users with products and product information.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to verify association of users with products and product information as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of verifying association of users with products and product information.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to verifying association of users with products and product information. The memory 805 also stores the data associated with or generated by the execution of the inventive steps.

Figure 9:
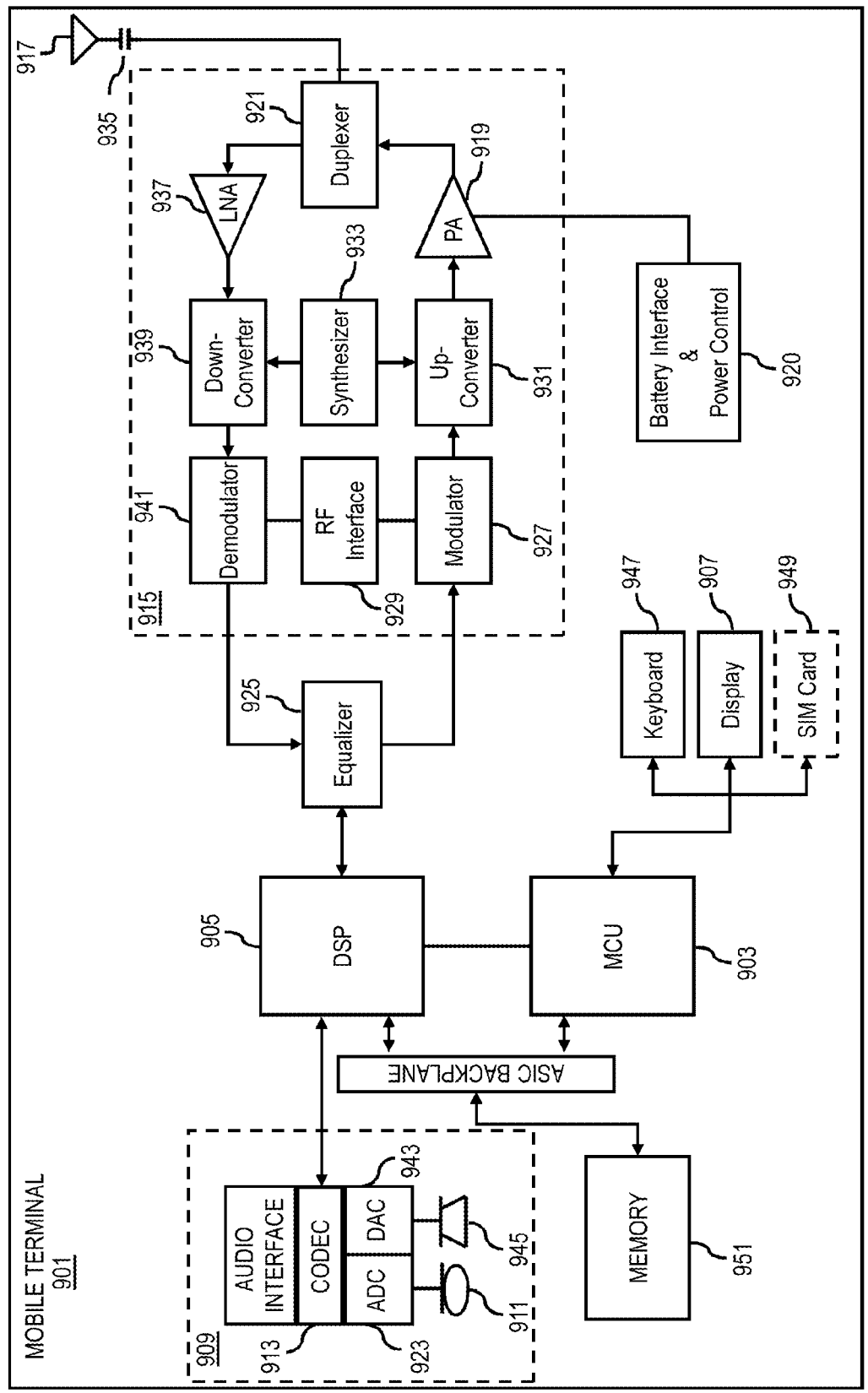
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of verifying association of users with products and product information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of verifying association of users with products and product information. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to verify association of users with products and product information. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by a processor, that a user is associated with at least one product based, at least in part, on receipt of an indicator and/or detection of the at least one product;
   associating, by the processor, one or more media files, one or more content files, or a combination thereof with the at least one product based, at least in part, on a comparison of one or more features extracted from the one or more media files, the one or more content files, or a combination thereof against one or more features associated with the at least one product, wherein the one or more features are related to metadata, audio features, visual features, or a combination thereof;
   generating, by the user, descriptive information of the at least one product based, at least in part, on a user experience of the at least one product;
   associating, by the processor, the descriptive information with the one or more media files, the one or more content files, or a combination thereof; and
   presenting, by the processor, user information, the descriptive information, the one or more media files, the one or more content files, or a combination thereof to one or more other users based, at least in part, on one or more settings of the user.

2. A method of claim 1, wherein the descriptive information includes one or more comments, rating, ranking, testimonials, quality information, user experience, or a combination thereof.

3. A method of claim 1, wherein the one or more settings include social proximity information, privacy information, security policies, user preference information, or a combination thereof.

4. A method of claim 1, further comprising:
   determining at least one search term associated with the at least one product; and
   querying one or more storage repositories, one or more devices associated with the user for the one or more media files, the one or more content files, or a combination thereof based, at least in part, on the at least one search term.

5. A method of claim 4, further comprising:
   determining one or more credentials for accessing the one or more storage repositories, the one or more devices, or a combination thereof from the user.

6. A method of claim 1, further comprising:
   generating at least one request for permission to (a) access the one or more media files, the one or more content files, or a combination thereof; (b) cause the association of the one or more media files, the one or more content files, or a combination thereof with the descriptive information; or (c) a combination thereof,
   wherein the association of the one or more media files, the one or more content files, or a combination thereof with the descriptive information is based, at least in part, on one or more responses from the user to the at least one request.

7. A method of claim 1, further comprising:
   processing the one or more media files, the one or more content files, related metadata, or a combination thereof to cause, at least in part, a verification that the one or more media files, the one or more content files, or a combination thereof were created via the user experience of the at least one product.

8. A method of claim 7, further comprising:
   processing the one or more media files, the one or more content files, one or more messages associated with the user, or a combination thereof to determine that the user is associated with the at least one product,
   wherein the association of the one or more media files, the one or more content files, or a combination thereof is based, at least in part, on the verification.

9. A method of claim 7, further comprising:
   determining ranking information for the user based, at least in part, on the verification.

10. A method of claim 1, further comprising:
    determining that the at least one product has a connectivity to a device associated with the user,
    wherein the one or more media files, the one or more content files, one or more characteristics of the at least one product, or a combination thereof is obtained over the connectivity.

11. An apparatus comprising:
    at least one processor; and
    at least one memory including computer program code for one or more programs,
    the at least one memory and the computer program code configured to, with the at least one processor, cause the apparatus to perform at least the following,
    determine, by the processor, that a user is associated with at least one product based, at least in part, on receipt of an indicator and/or detection of the at least one product;

associate, by the processor, one or more media files, one or more content files, or a combination thereof with the at least one product based, at least in part, on a comparison of one or more features extracted from the one or more media files, the one or more content files, or a combination thereof against one or more features associated with the at least one product, wherein the one or more features are related to metadata, audio features, visual features, or a combination thereof;

generate, by the user, descriptive information of the at least one product based, at least in part, on a user experience of the at least one product;

associate, by the processor, the descriptive information with the one or more media files, the one or more content files, or a combination thereof;

present, by the processor, user information, the descriptive information, the one or more media files, the one or more content files, or a combination thereof to one or more other users based, at least in part, on one or more settings of the user.

12. An apparatus of claim 11, wherein the descriptive information includes one or more comments, rating, ranking, testimonials, quality information, user experience, or a combination thereof.

13. An apparatus of claim 11, wherein the one or more settings include social proximity information, privacy information, security policies, user preference information, or a combination thereof.

14. An apparatus of claim 11, wherein the apparatus is further caused to:
determine at least one search term associated with the at least one product; and
query one or more storage repositories, one or more devices associated with the user for the one or more media files, the one or more content files, or a combination thereof based, at least in part, on the at least one search term.

15. An apparatus of claim 14, wherein the apparatus is further caused to:
determine one or more credentials for accessing the one or more storage repositories, the one or more devices, or a combination thereof from the user.

16. An apparatus of claim 11, wherein the apparatus is further caused to:
generate at least one request for permission to (a) access the one or more media files, the one or more content files, or a combination thereof; (b) cause the association of the one or more media files, the one or more content files, or a combination thereof with the descriptive information; or (c) a combination thereof,
wherein the association of the one or more media files, the one or more content files, or a combination thereof with the descriptive information is based, at least in part, on one or more responses from the user to the at least one request.

17. An apparatus of claim 11, wherein the apparatus is further caused to:
process the one or more media files, the one or more content files, related metadata, or a combination thereof to cause, at least in part, a verification that the one or more media files, the one or more content files, or a combination thereof were created via the user experience of the at least one product.

18. An apparatus of claim 17, wherein the apparatus is further caused to:
process the one or more media files, the one or more content files, one or more messages associated with the user, or a combination thereof to determine that the user is associated with the at least one product,
wherein the association of the one or more media files, the one or more content files, or a combination thereof is based, at least in part, on the verification.

19. An apparatus of claim 17, wherein the apparatus is further caused to:
determine ranking information for the user based, at least in part, on the verification.

20. An apparatus of claim 11, wherein the apparatus is further caused to:
determine that the at least one product has a connectivity to a device associated with the user,
wherein the one or more media files, the one or more content files, one or more characteristics of the at least one product, or a combination thereof is obtained over the connectivity.

* * * * *